United States Patent
Natori et al.

(10) Patent No.: US 10,167,950 B2
(45) Date of Patent: Jan. 1, 2019

(54) VEHICLE, AND CONTROL METHOD FOR VEHICLE

(71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Akio Natori, Nagoya (JP); Makoto Sawada, Nisshin (JP); Kiyoshi Watanabe, Anjo (JP); Takeshi Torii, Okazaki (JP); Toshiaki Hayashi, Anjo (JP); Masashi Takizawa, Anjo (JP)

(73) Assignees: TOYOTA JIDOSHA KABUSHIKI KAISHA, Toyota (JP); AISIN AW CO., LTD., Anjo-shi (JP)

( * ) Notice: Subject to any disclaimer, the term of this patent is extended or adjusted under 35 U.S.C. 154(b) by 411 days.

(21) Appl. No.: 14/901,164

(22) PCT Filed: Jun. 17, 2014

(86) PCT No.: PCT/IB2014/001079
§ 371 (c)(1),
(2) Date: Dec. 28, 2015

(87) PCT Pub. No.: WO2014/207525
PCT Pub. Date: Dec. 31, 2014

(65) Prior Publication Data
US 2016/0123462 A1 May 5, 2016

(30) Foreign Application Priority Data
Jun. 28, 2013 (JP) .................. 2013-137515

(51) Int. Cl.
*F16H 61/14* (2006.01)

(52) U.S. Cl.
CPC ..... *F16H 61/143* (2013.01); *F16H 2061/146* (2013.01)

(58) Field of Classification Search
CPC ... F16H 61/143; F16H 2061/146; F16H 61/14
See application file for complete search history.

(56) References Cited

U.S. PATENT DOCUMENTS

2004/0144608 A1    7/2004  Kobayashi et al.
2010/0282558 A1*  11/2010  Ishiwada ............. F16H 61/0206
                                                                192/3.29

FOREIGN PATENT DOCUMENTS

| DE | 103 60 479 A1 | 7/2004 |
| JP | 2006-226333 A | 8/2006 |
| JP | 2011-202776 A | 10/2011 |
| JP | 2012-047301 A | 3/2012 |

* cited by examiner

*Primary Examiner* — Huan Le
(74) *Attorney, Agent, or Firm* — Oliff PLC

(57) ABSTRACT

When engagement of a lockup clutch is initiated, coupling of the lockup clutch is initiated in a state where a working fluid amount is sufficiently ensured by setting a condition that an engine rotation speed is higher than or equal to a limit engine rotation speed. Thus, it is possible to prevent rapid engagement of the lockup clutch. Here, the limit engine rotation speed is appropriately determined on the basis of a line pressure, and it is possible to reduce a delay of coupling of the lockup clutch by ensuring the working fluid amount while preventing rapid engagement of the lockup clutch.

7 Claims, 7 Drawing Sheets

VEHICLE, AND CONTROL METHOD FOR VEHICLE

BACKGROUND OF THE INVENTION

1. Field of the Invention

The invention relates to a vehicle and a control method for a vehicle. The invention more specifically relates to suppressing a shock due to rapid engagement of a lockup clutch, which occurs during coupling of the lockup clutch.

2. Description of Related Art

There is a well-known vehicle driving device including a fluid transmission device in a power transmission path between a driving source and drive wheels and further including a lockup clutch that selectively directly couples input and output sides of the fluid transmission device. For example, one example of this is a vehicle driving device described in Japanese Patent Application Publication No. 2006-226333 (JP 2006-226333 A). The driving device of JP 2006-226333 A includes a torque converter that functions as a fluid transmission device, and JP 2006-226333 A describes so-called flexible lockup start control for improving fuel economy by slip-engaging the lockup clutch at the time when the vehicle starts traveling from a state where the vehicle is stopped.

SUMMARY OF THE INVENTION

When working fluid is in a high-temperature state or when working fluid having a low-viscosity characteristic is employed, the amount of leakage of working fluid in a hydraulic control circuit increases. At this time, at the time of executing flexible lockup control for slip-engaging the lockup clutch, there is a possibility that it is not possible to ensure a sufficient amount of working fluid. For example, when flexible lockup control is initiated in a state where a hydraulic pressure in a releasing-side hydraulic chamber of the lockup clutch is decreased, there is a possibility that a shock occurs due to rapid engagement of the lockup clutch immediately after the initiation of flexible lockup control.

The invention provides a vehicle and a control method for a vehicle, which are able to prevent a shock by suppressing rapid engagement of a lockup clutch after the initiation of flexible lockup control.

A first aspect of the invention provides a vehicle. The vehicle includes: a lockup clutch configured to selectively directly couple-input and output sides of a fluid transmission device provided in a power transmission path between a driving source and a drive wheel; an oil pump configured to operate with rotation of the driving source; and an electronic control unit. Working fluid is supplied to an engaging-side hydraulic chamber and a releasing-side hydraulic chamber of the lockup clutch by using a hydraulic pressure of the working fluid that is discharged from the oil pump as a source pressure. The working fluid is supplied to the releasing-side hydraulic chamber when the lockup clutch is released, and the working fluid is supplied to the engaging-side hydraulic chamber when engagement of the lockup clutch is initiated. The electronic control unit is configured to initiate engagement of the lockup clutch when a working fluid amount that is supplied to the releasing-side hydraulic chamber has reached a predetermined value or larger, and determine the predetermined value on the basis of a hydraulic pressure of the working fluid flowing through a fluid passage that communicates with the oil pump.

According to the above aspect, when engagement of the lockup clutch is initiated, coupling of the lockup clutch is initiated in a state where the working fluid amount is sufficiently ensured by setting a condition that the working fluid amount that is supplied to the releasing-side hydraulic chamber is larger than or equal to the predetermined value. Thus, for example, it is possible to prevent rapid engagement of the lockup clutch, which occurs through coupling of the lockup clutch in a state where the hydraulic pressure of the working fluid in the releasing-side hydraulic chamber of the lockup clutch is decreased. Here, because the working fluid amount is appropriately determined on the basis of the hydraulic pressure of the working fluid flowing through the fluid passage that communicates with the oil pump, it is possible to reduce a delay of coupling of the lockup clutch by ensuring the working fluid amount while preventing rapid engagement of the lockup clutch.

In the above aspect, the electronic control unit may be configured to determine that the working fluid amount has reached the predetermined value or larger when a rotation speed of the driving source is kept at a predetermined rotation speed or higher, the predetermined rotation speed being determined on the basis of the hydraulic pressure of the working fluid and a fluid temperature of the working fluid. According to the above aspect, because the working fluid amount is allowed to be calculated from the rotation speed of the driving source, it is possible to easily determine that the working fluid amount becomes larger than or equal to the predetermined value on the basis of the rotation speed of the driving source.

In the above aspect, the electronic control unit may be configured to determine that the working fluid amount has reached the predetermined value or larger when the rotation speed of the driving source is kept at the predetermined rotation speed or higher for a predetermined time or longer. According to the above aspect, it is possible to easily determine that the working fluid amount becomes larger than or equal to the predetermined value on the basis of the rotation speed of the driving source and the predetermined time.

In the above aspect, the electronic control unit may be configured to determine the predetermined time on the basis of the fluid temperature of the working fluid. According to the above aspect, it is possible to set the appropriate predetermined time that compensates for the amount of leakage of the working fluid, which increases in proportion to the fluid temperature of the working fluid.

In the above aspect, the electronic control unit may be configured to set the predetermined value such that the predetermined value increases as the hydraulic pressure of the working fluid flowing through the fluid passage that communicates with the oil pump increases. According to the above aspect, it is possible to prevent shortage of the working fluid amount by compensating for the amount of leakage of the working fluid, which increases as the hydraulic pressure of the working fluid increases.

In the above aspect, the electronic control unit may be configured to set the predetermined value such that the predetermined value increases as the fluid temperature of the working fluid increases. According to the above aspect, it is possible to prevent shortage of the working fluid amount by compensating for the amount of leakage of the working fluid, which increases as the hydraulic pressure of the working fluid increases.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a functional block diagram that illustrates a relevant portion of control functions mainly according to flexible start control in an electronic control unit that controls the hydraulic control circuit, an engine, and the like;

DETAILED DESCRIPTION OF EMBODIMENTS

Hereinafter, an embodiment of the invention will be described in detail with reference to the accompanying drawings. In the following embodiment, the drawings are simplified or modified as needed, and the scale ratio, shape, and the like, of various portions are not always accurately drawn.

Figure 1:
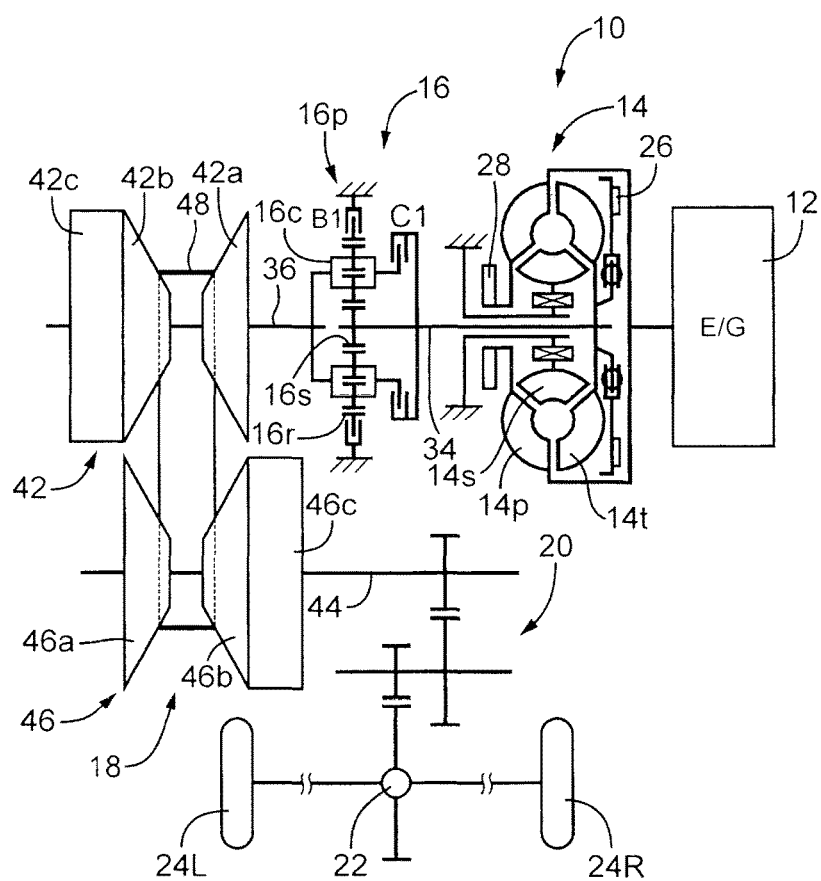
FIG. 1 is a skeletal view that illustrates the configuration of a vehicle driving device to which the invention is suitably applied.

FIG. 1 is a skeletal view that illustrates the configuration of a vehicle driving device 10 to which the invention is applied. The vehicle driving device 10 is a transverse-mounted automatic transmission, and is suitably employed in a front-engine front-drive (FF) vehicle. The vehicle driving device 10 includes an engine 12 as a driving source for propelling the vehicle. The output of the engine 12 formed of an internal combustion engine is transmitted from a crankshaft of the engine 12 and a torque converter 14 to a differential gear unit 22 via a steering reverser 16, a belt-type continuously variable transmission (CVT) 18 and a speed reduction gear unit 20. The torque converter 14 serves as a fluid transmission device. The output of the engine 12, transmitted to the differential gear unit 22, is distributed to right and left drive wheels 24R, 24L.

The torque converter 14 is provided in a power transmission path between the engine 12 and the drive wheels 24. The torque converter 14 includes a pump impeller 14p, a turbine impeller 14t and a stator impeller 14s. The pump impeller 14p is coupled to the crankshaft of the engine 12. The stator impeller 14s is interposed between the pump impeller 14p and the turbine impeller 14t, and is coupled to a non-rotating member via a one-way clutch. The torque converter 14 transmits power via fluid. The turbine impeller 14t is coupled to the steering reverser 16 via a turbine shaft 34. The turbine shaft 34 corresponds to an output-side member of the torque converter 14. A lockup clutch 26 is provided between the pump impeller 14p and the turbine impeller 14t. The lockup clutch 26 is engaged (coupled) or released by switching supply of hydraulic pressure between an engaging-side hydraulic chamber and a releasing-side hydraulic chamber with the use of lockup relay valves, and the like, in a hydraulic control circuit 70 (see FIG. 2 and FIG. 3). When the lockup clutch 26 is completely engaged, the pump impeller 14p and the turbine impeller 14t integrally rotate. In this way, the lockup clutch 26 selectively directly couples input and output sides (the pump impeller 14p and the turbine impeller 14t) of the torque converter 14. A mechanical oil pump 28 is coupled to the pump impeller 14p. The mechanical oil pump 28 generates hydraulic pressure for controlling a shift change of a continuously variable transmission 18, generating a belt clamping pressure, controlling engagement and release of the lockup clutch 26 or supplying lubricant to various portions as the oil pump 28 is rotationally driven by the engine 12. The pump impeller 14p is coupled to the engine 12 via the crankshaft, so the oil pump 28 is driven with the rotation of the engine 12.

The forward-reverse switching device 16 is mainly formed of a forward clutch C1, a reverse brake B1 and a double pinion-type planetary gear unit 16p. The turbine shaft 34 of the torque converter 14 is integrally coupled to a sun gear 16s. An input shaft 36 of the continuously variable transmission 18 is integrally coupled to a carrier 16c. The carrier 16c and the sun gear 16s are selectively coupled to each other via the forward clutch C1. A ring gear 16r is selectively fixed to a housing via the reverse brake B1. The forward clutch C1 and the reverse brake B1 are examples of an interrupting device. The forward clutch C1 and the reverse brake B1 each are a hydraulic friction engagement device that is frictionally engaged by a hydraulic actuator.

When the forward clutch C1 is engaged and the reverse brake B1 is released, the forward-reverse switching device 16 is placed in an integrally rotatable state. Thus, the turbine shaft 34 is directly coupled to the input shaft 36, a forward power transmission path is established (attained), and forward driving force is transmitted to the continuously variable transmission 18 side. When the reverse brake B1 is engaged and the forward clutch C1 is released, a reverse power transmission path is established (attained) in the forward-reverse switching device 16. As a result, the input shaft 36 is rotated in the reverse direction with respect to the turbine shaft 34, and reverse driving force is transmitted to the continuously variable transmission 18 side. When both the forward clutch C1 and the reverse brake B1 are released, the forward-reverse switching device 16 is placed in a neutral state (power transmission interrupted state) where transmission of power is interrupted.

The continuously variable transmission 18 includes a drive-side pulley (primary pulley, primary sheave) 42 and a driven-side pulley (secondary pulley, secondary sheave) 46. The drive-side pulley 42 is an input-side member provided on the input shaft 36, and its effective diameter is variable. The driven-side pulley 46 is an output-side member provided on an output shaft 44, and its effective diameter is variable. The continuously variable transmission 18 includes a transmission belt 48 wound around the drive-side pulley 42 and the driven-side pulley 46. Power is transmitted via friction force between the drive-side pulley 42 and the transmission belt 48 and friction force between the driven-side pulley 46 and the transmission belt 48.

The drive-side pulley 42 includes a fixed rotor 42a fixed to the input shaft 36. The driven-side pulley 46 includes a fixed rotor 46a fixed to the output shaft 44. The drive-side pulley 42 includes a movable rotor 42b provided on the input shaft 36 so as to be relatively non-rotatable around its axis and movable in the axial direction. The driven-side pulley 46 includes a movable rotor 46b provided on the output shaft 44 so as to be relatively non-rotatable around its axis and movable in the axial direction. Hydraulic actuators that apply thrust for changing the V-groove width of the drive-side pulley 42 and the V-groove width of the driven-side pulley 46 include a drive-side hydraulic actuator (primary pulley-side hydraulic actuator) 42c and a driven-side hydraulic actuator (secondary pulley-side hydraulic actuator) 46c. The flow rate of working fluid that is supplied to or drained from the drive-side hydraulic actuator 42c is controlled by the hydraulic control circuit 70. Thus, the V-groove width of each of the drive-side pulley 42 and the driven-side pulley 46 varies, and a winding diameter (effective diameter) of the transmission belt 48 is changed. Thus, a speed ratio γ(=Input shaft rotation speed Nin/Output shaft rotation speed Nout) is continuously varied. A belt clamping pressure Pd that is the hydraulic pressure of the driven-side hydraulic actuator 46c is regulated and controlled by the hydraulic control circuit 70 such that the transmission belt 48 does not slip.

Figure 2:
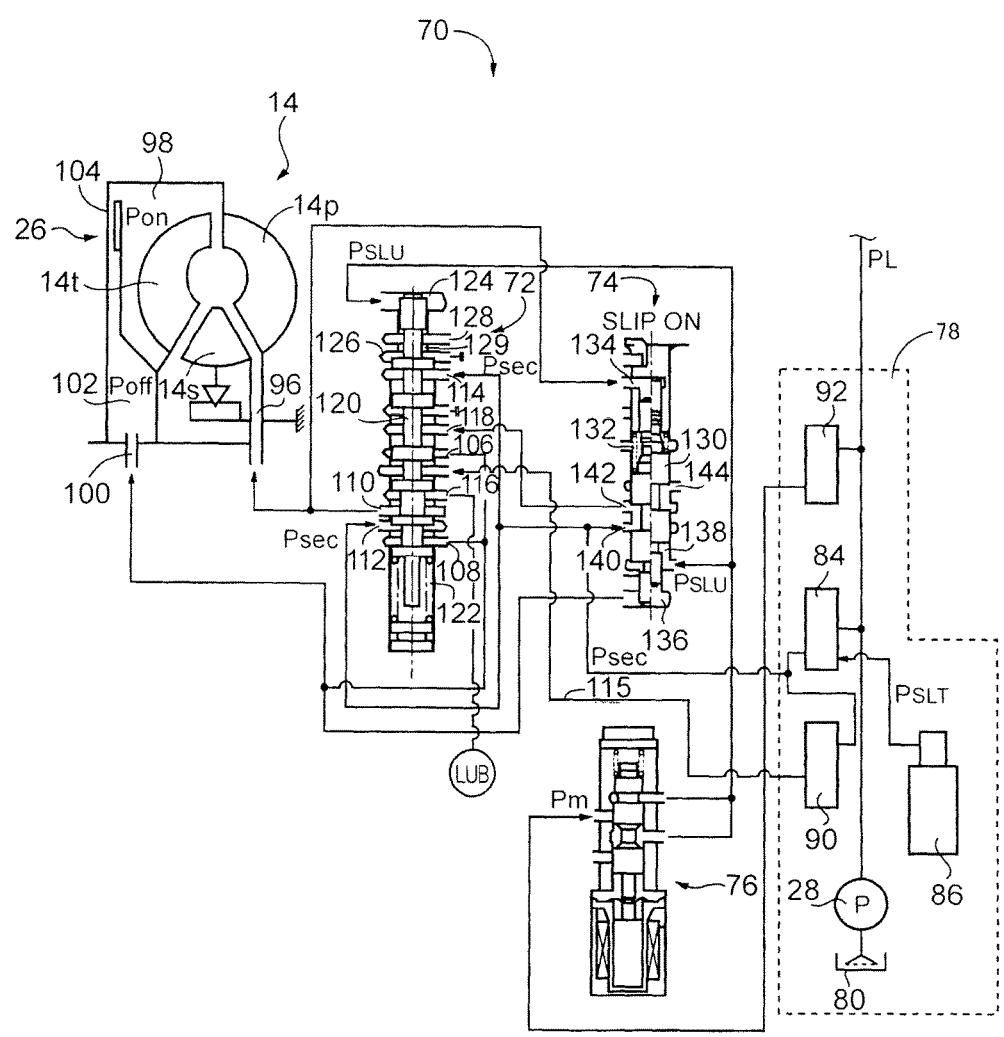
FIG. 2 is a view that shows the configuration of a hydraulic control device that mainly controls a lockup clutch in the hydraulic control circuit of the vehicle driving device shown in FIG. 1, which executes shift control over a belt-type continuously variable transmission and lockup control over the lockup clutch.
Figure 3:
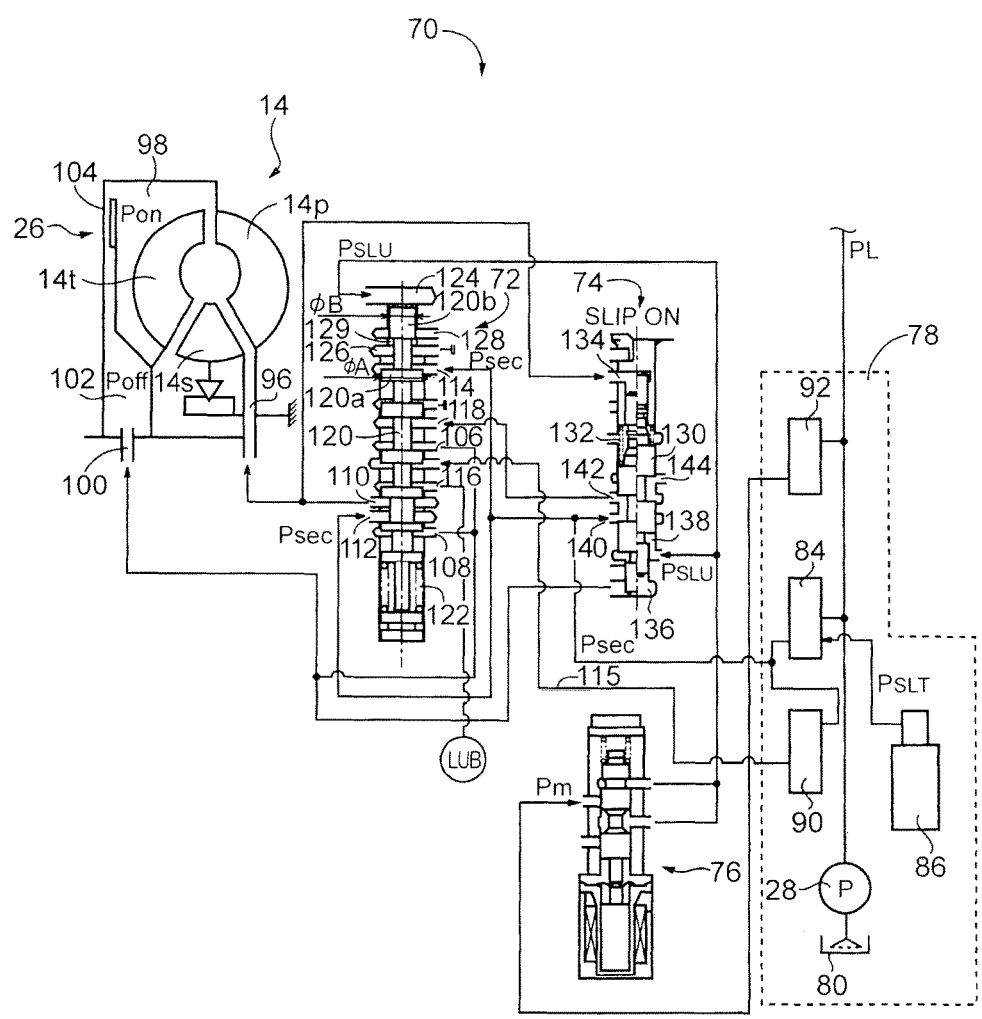
FIG. 3 is another view that shows the configuration of the hydraulic control device that mainly controls the lockup clutch in the hydraulic control circuit of the vehicle driving device shown in FIG. 1, which executes shift control over the belt-type continuously variable transmission and lockup control over the lockup clutch.

FIG. 2 and FIG. 3 particularly show the configuration of a hydraulic control device that controls the lockup clutch 26, which is a relevant portion of the invention, in the hydraulic control circuit 70 of the vehicle driving device 10. The hydraulic control circuit 70 executes shift control over the belt-type continuously variable transmission 18 and lockup control over the lockup clutch 26. FIG. 2 shows a state where a spool valve element 120 of a lockup relay valve 72 (described later) is switched to an off position that is a released state of the lockup clutch 26. FIG. 3 shows a state where the spool valve element 120 of the lockup relay valve 72 is switched to an on position that is an engaged state of the lockup clutch 26.

The hydraulic control circuit 70 includes the lockup relay valve 72 that switches the lockup clutch 26 into any one of the engaged state and the released state. The hydraulic control circuit 70 includes a lockup control valve 74. The lockup control valve 74 controls an engaging pressure of the lockup clutch 26 when the lockup clutch 26 is in the engaged state. The hydraulic control circuit 70 includes a linear solenoid valve 76 (solenoid valve). The linear solenoid valve 76 carries out switching control over the lockup relay valve 72 and control over an output pressure that is output from the lockup control valve 74. The hydraulic control circuit 70 includes a hydraulic pressure generating mechanism 78. The hydraulic pressure generating mechanism 78 generates hydraulic pressure that is supplied to the lockup relay valve 72, the lockup control valve 74, the linear solenoid valve 76, and the like. Thus, the hydraulic control circuit 70 is configured to include the lockup relay valve 72, the lockup control valve 74, the linear solenoid valve 76 and the hydraulic pressure generating mechanism 78.

The hydraulic pressure generating mechanism 78 includes the oil pump 28. The oil pump 28 is driven by the engine 12 in order to draw working fluid, returned to an oil pan 80, and feed the working fluid under pressure. The hydraulic pressure generating mechanism 78 includes a relief-type first regulating valve 84 (primary regulator valve). The first regulating valve 84 regulates the pressure of working fluid, fed under pressure from the oil pump 28, to a line pressure PL. The hydraulic pressure generating mechanism 78 includes a relief-type second regulating valve 90 (secondary regulator valve). The second regulating valve 90 regulates the pressure of working fluid, drained (relieved) from the first regulating valve 84 for regulating the pressure, to a second line pressure Psec. The hydraulic pressure generating mechanism 78 includes a third regulating valve 92 (modulator valve). The third regulating valve 92 is a pressure reducing valve, and generates a preset predetermined modulator pressure Pm by using the line pressure PL as a source pressure. The first regulating valve 84 is controlled on the basis of a control pressure $P_{SLT}$ that is output from the linear solenoid valve 86, and generates the line pressure PL based on the traveling state of the vehicle. The line pressure PL is, for example, supplied to a shift control circuit of the belt-type continuously variable transmission 18, or the like (see FIG. 4).

The lockup clutch 26 is a hydraulic friction engagement clutch that is frictionally engaged with a front cover 104 by a differential pressure ΔP (Pon−Poff) between a hydraulic pressure Pon and a hydraulic pressure Poff. The hydraulic pressure Pon is a hydraulic pressure in the engaging-side hydraulic chamber 98 to which working fluid is supplied via an engaging fluid passage 96. The hydraulic pressure Poff is a hydraulic pressure in the releasing-side hydraulic chamber 102 to which working fluid is supplied via a releasing fluid passage 100. The operating condition of the torque converter 14 is, for example, roughly classified into a so-called lockup off state where the differential pressure ΔP is negative and the lockup clutch 26 is placed in the released state, a so-called slipped state where the differential pressure ΔP is higher than or equal to zero and the lockup clutch 26 is placed in a semi-engaged state and a so-called lockup on state where the differential pressure ΔP is a maximum value and the lockup clutch 26 is completely engaged. The hydraulic pressure of working fluid that is discharged from the oil pump 28 is supplied as a source pressure to these releasing-side hydraulic chamber 102 and engaging-side hydraulic chamber 98.

The lockup relay valve 72 is a valve for switching the lockup clutch 26 into one of the engaged state and the released state. The lockup relay valve 72 includes a first releasing port 106, a second releasing port 108, an engaging port 110, a first input port 112 and a second input port 114. The first releasing port 106 and the second releasing port 108 communicate with the releasing-side hydraulic chamber 102. The engaging port 110 communicates with the engaging-side hydraulic chamber 98. The second line pressure Psec is supplied to the first input port 112 and the second input port 114. The lockup relay valve 72 includes a lubricating port 116. The lubricating port 116 is communicated with the engaging-side hydraulic chamber 98 when the lockup clutch 26 is released, and is communicated with a fluid passage 115 to which working fluid is supplied. The working fluid is drained (relieved) in order for the second regulating valve 90 to regulate hydraulic pressure when the lockup clutch 26 is engaged. The lockup relay valve 72 includes a bypass port 118. The bypass port 118 communicates with the releasing-side hydraulic chamber 102 when the lockup clutch 26 is engaged. The lockup relay valve 72 includes the spool valve element 120 for switching the fluid passage of the lockup relay valve 72 to the on position or the off position. In the on position, the lockup clutch 26 is placed in the engaged state. In the off position, the lockup clutch 26 is placed in the released state. The lockup relay valve 72 includes a spring 122. The spring 122 applies thrust in a direction toward the off position side shown in FIG. 2, to the spool valve element 120. The lockup relay valve 72 includes a fluid chamber 124. The fluid chamber 124 receives a signal pressure $P_{SLU}$ from the linear solenoid valve 76 in order to apply thrust to the spool valve element 120 toward the on position side shown in FIG. 3 by applying the signal pressure $P_{SLU}$ to the end portion of the spool valve element 120. The lubricating port 116 is connected to a lubricant passage (not shown). Working fluid that is drained from the lubricating port 116 is supplied as lubricant for mechanical elements that constitute the forward-reverse switching device 16, the belt-type continuously variable transmission 18, the speed reduction gear unit 20, the differential gear unit 22, and the like.

The lockup relay valve 72 includes a drain port 128 and a switching port 126. The switching port 126 is a closed system and is communicated with a switching fluid chamber 129 having a different pressure receiving area. The switching port 126 is communicated with the drain port 128 via the switching fluid chamber 129 in a state where the spool valve element 120 is positioned at the off position side (FIG. 2). On the other hand, the switching port 126 is communicated with the second input port 114 via the switching fluid chamber 129 in a state where the spool valve element 120 is positioned at the on position side (FIG. 3). Here, the switching fluid chamber 129 that is communicated with the switching port 126 is partitioned by a land having a different pressure receiving area to provide a pressure receiving area difference. When the second line pressure Psec is supplied from the second input port 114 into the switching fluid chamber 129, thrust that urges the spool valve element 120 toward the on position side is applied on the basis of the hydraulic pressure of the working fluid and the pressure receiving area difference of the switching fluid chamber 129. For example, when the spool valve element 120 is switched toward the off position side and the switching port 126 and the drain port 128 are communicated with each other, working fluid in the switching fluid chamber 129 is drained from the drain port 128. Thus, thrust does not occur at the spool valve element 120. On the other hand, when the switching port 126 and the second input port 114 are communicated with each other via the switching fluid chamber 129, thrust that urges the spool valve element 120 toward the on position side is generated on the basis of the second line pressure Psec that is supplied from the second input port 114 to the switching fluid chamber 129 and the pressure receiving area difference (pressure receiving area difference ΔA) of the switching fluid chamber 129.

Specifically, the switching fluid chamber 129 that is formed in the switching port 126 is partitioned by a land 120a having a cross-sectional diameter of φA and a land 120b having a cross-sectional diameter of φB. The cross-sectional diameter φA of the land 120a is larger than the cross-sectional diameter φB of the land 120b, so the land 120a has a larger pressure receiving area. Thus, because the predetermined pressure receiving area difference ΔA is established, when the switching port 126 and the second input port 114 are communicated with each other, the second line pressure Psec is supplied from the second input port 114 to the switching fluid chamber 129. Thus, thrust that is expressed by the product of the pressure receiving area difference ΔA and the second line pressure Psec is applied. The spool valve element 120 is urged by the thrust in a direction toward the on position side.

The lockup control valve 74 includes a spool valve element 130. The spool valve element 130 switches the state of the valve. The lockup control valve 74 includes a spring 132. The spring 132 applies thrust for urging the spool valve element 130 toward a slip position side (SLIP). The lockup control valve 74 includes a fluid chamber 134. The fluid chamber 134 receives the hydraulic pressure Pon in the engaging-side hydraulic chamber 98 of the torque converter 14 in order to urge the spool valve element 130 toward the slip position side. The lockup control valve 74 includes a fluid chamber 136. The fluid chamber 136 receives the hydraulic pressure Poff in the releasing-side hydraulic chamber 102 of the torque converter 14 in order to urge the spool valve element 130 toward a completely engaged position side (ON). The lockup control valve 74 includes a fluid chamber 138. The fluid chamber 138 receives the signal pressure $P_{SLU}$ that is output from the linear solenoid valve 76 in order to urge the spool valve element 130 toward the on position side. The lockup control valve 74 includes an input port 140. The input port 140 is supplied with the second line pressure Psec regulated by the second regulating valve 90. The lockup control valve 74 includes a control port 142. The control port 142 communicates with the input port 140 at the time when the spool valve element 130 is positioned at the slip position side. In FIG. 2 and FIG. 3, the left side of the lockup control valve 74 with respect to the central axis shows a state where the spool valve element 130 is located at the slip position side (SLIP). The right side of the lockup control valve 74 with respect to the central axis shows a state where the spool valve element 130 is located at the completely engaged position side (ON).

The linear solenoid valve 76 outputs the signal pressure $P_{SLU}$ for controlling the engaging pressure of the lockup clutch 26 on the basis of a command from the electronic control unit when the lockup clutch 26 is engaged. The linear solenoid valve 76 uses the modulator pressure Pm, which is generated by the third regulating valve 92, as a source pressure, and generates the signal pressure $P_{SLU}$ by reducing the modulator pressure Pm. The linear solenoid valve 76 applies the signal pressure $P_{SLU}$ to the fluid chamber 124 of the lockup relay valve 72 as a switching signal pressure of the lockup relay valve 72. When the signal pressure $P_{SLU}$ in the fluid chamber 124 becomes higher than or equal to a predetermined switching pressure, the spool valve element 120 of the lockup relay valve 72 is moved from the off position side (FIG. 2) toward the on position side (FIG. 3) against the urging force of the spring 122 toward the off position side. At this time, the second line pressure Psec supplied to the first input port 112 is supplied from the engaging port 110 to the engaging-side hydraulic chamber 98 via the engaging fluid passage 96. The second line pressure Psec that is supplied to the engaging-side hydraulic chamber 98 becomes the hydraulic pressure Pon. That is, when coupling of the lockup clutch 26 is initiated, hydraulic pressure is supplied to the engaging-side hydraulic chamber 98. At the same time, the releasing-side hydraulic chamber 102 is communicated through the releasing fluid passage 100 from the first releasing port 106 to the control port 142 of the lockup control valve 74 via the bypass port 118. The differential pressure ΔP(=Pon−Poff) between the hydraulic pressure Pon in the engaging-side hydraulic chamber 98 and the hydraulic pressure Poff in the releasing-side hydraulic chamber 102 is adjusted by the lockup control valve 74 so as to increase with an increase in the signal pressure $P_{SLU}$. Thus, the operation state of the lockup clutch 26 is adjusted within the range of the slipped state to the lockup on state (completely lockup state).

Specifically, while the spool valve element 120 of the lockup relay valve 72 is switched toward the on position side, when the output of the signal pressure $P_{SLU}$ is lower than the predetermined switching pressure and the spool valve element 130 is located at the slip position (SLIP) side by the urging force of the spring 132 in the lockup control valve 74, the second line pressure Psec supplied to the input port 140 is supplied from the control port 142 to the releasing-side hydraulic chamber 102 via the bypass port 118, the first releasing port 106 and the releasing fluid passage 100. The time when the spool valve element 120 of the lockup relay valve 72 is set to the on position side is the time when the signal pressure $P_{SLU}$ is set so as to be higher than the predetermined switching pressure and the lockup clutch 26 is switched to the engaged state. In this state, the differential pressure ΔP(=Pon−Poff) is controlled by the linear solenoid valve 76 on the basis of the magnitude of the signal pressure $P_{SLU}$ within the range from the switching pressure to the maximum value, and the control port 142 communicates the input port 140 and the drain port 144 with each other. Thus, the releasing-side hydraulic chamber 102 is controlled on the basis of the magnitude of the signal pressure $P_{SLU}$ within the range in which the differential pressure ΔP(=Pon−Poff) ranges from the switching pressure to the maximum value, and the slipped state of the lockup clutch 26 is controlled.

While the spool valve element 120 of the lockup relay valve 72 is switched to the on position side, when the maximum signal pressure $P_{SLU}$ that moves the spool valve element 130 to the completely engaged position (ON) is supplied to the fluid chamber 138 in the lockup control valve 74, the input port 140 is shut off. Thus, the second line pressure Psec is not supplied to the releasing-side hydraulic chamber 102. Working fluid in the releasing-side hydraulic chamber 102 is drained from the drain port 144. Thus, the differential pressure ΔP(=Pon−Poff) is maximized, and the lockup clutch 26 is placed in the completely engaged state.

On the other hand, when the signal pressure $P_{SLU}$ that is supplied to the fluid chamber 124 is decreased below the predetermined switching pressure and the spool valve element 120 is moved toward the off position side (FIG. 2) by the urging force of the spring 122 in the lockup relay valve 72, the second line pressure Psec supplied to the first input port 112 is supplied from the second releasing port 108 to the releasing-side hydraulic chamber 102 via the releasing fluid passage 100. Working fluid passes through the engaging-side hydraulic chamber 98 and then through the engaging fluid passage 96, and is supplied to the engaging port 110, and is then supplied from the lubricating port 116 to a lubricant passage (not shown). Thus, the lockup clutch 26 is placed in lockup off. That is, when the lockup clutch 26 is released (during lockup off), hydraulic pressure is supplied to the releasing-side hydraulic chamber 102.

Figure 4:
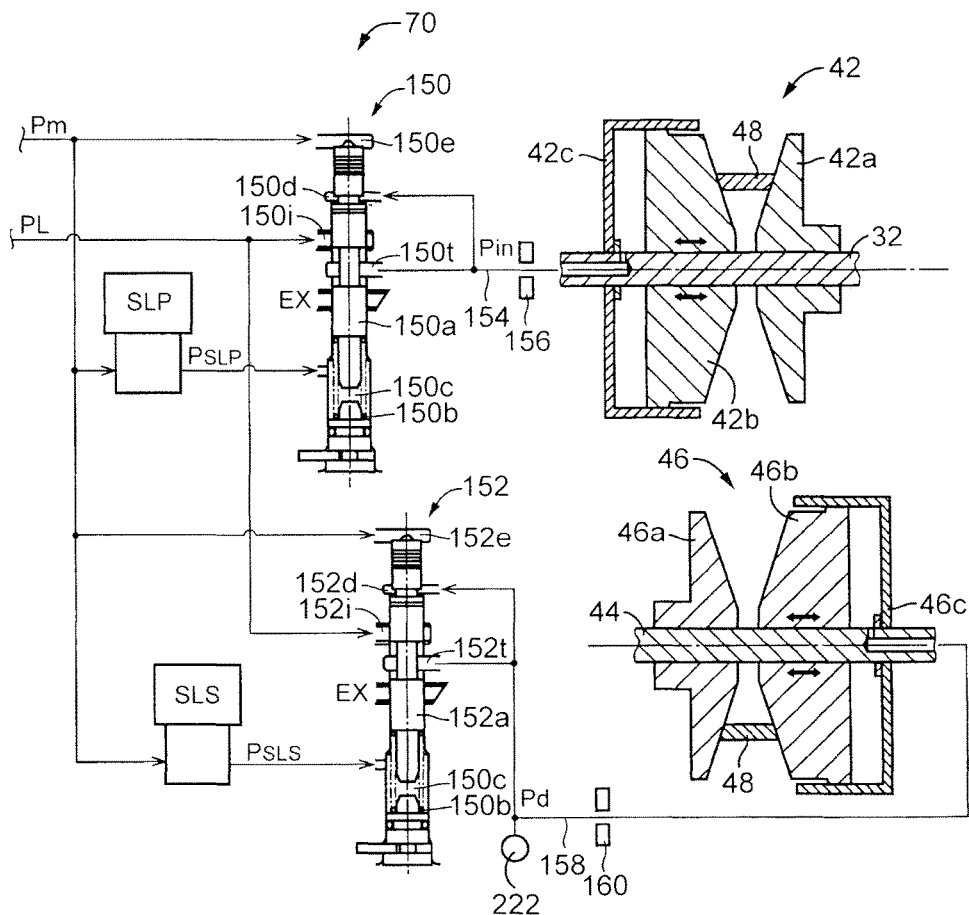
FIG. 4 is a hydraulic circuit diagram mainly associated with shift control over the continuously variable transmission in the hydraulic control circuit of the vehicle driving device shown in FIG. 1, which executes shift control over the belt-type continuously variable transmission and lockup control over the lockup clutch.

FIG. 4 shows a hydraulic circuit diagram associated with shift control over the continuously variable transmission 18 within the hydraulic control circuit 70. As shown in FIG. 4, a primary pressure control valve 150, a secondary pressure control valve 152, a linear solenoid valve SLP, a linear solenoid valve SLS, and the like, are provided. The primary pressure control valve 150 regulates a primary pressure Pin. The secondary pressure control valve 152 regulates a secondary pressure Pd. The line pressure PL and the modulator pressure Pm shown in FIG. 4 are regulated by the first regulating valve 84 and the third regulating valve 92 that are shown in FIG. 2 and FIG. 3.

The primary pressure control valve 150 includes a spool valve element 150a. The spool valve element 150a is provided movably in the axial direction, and supplies the line pressure PL from an input port 150i to the primary pulley 42 via an output port 150t by opening the input port 150i. The primary pressure control valve 150 includes a spring 150b. The spring 150b serves as urging means for urging the spool valve element 150a in a valve opening direction. The primary pressure control valve 150 includes a fluid chamber 150c. The fluid chamber 150c accommodates the spring 150b. and receives a control hydraulic pressure $P_{SLP}$ for applying thrust in the valve opening direction to the spool valve element 150a. The primary pressure control valve 150 includes a feedback fluid chamber 150d. The feedback fluid chamber 150d receives the line pressure PL output from the output port 150t in order to apply thrust in the valve closing direction to the spool valve element 150a. The primary pressure control valve 150 includes a fluid chamber 150e. The fluid chamber 150e receives the modulator hydraulic pressure Pm in order to apply thrust in the valve closing direction to the spool valve element 150a.

The thus configured primary pressure control valve 150, for example, regulates and controls the line pressure PL by using the control hydraulic pressure $P_{SLP}$ as a pilot pressure, and supplies the regulated pressure to the primary-side hydraulic cylinder 42c of the primary pulley 42. Thus, the primary pressure Pin that is supplied to the primary-side hydraulic cylinder 42c is controlled. For example, in a state where a predetermined hydraulic pressure is supplied to the primary-side hydraulic cylinder 42c, when the control hydraulic pressure $P_{SLP}$ that is output from the linear solenoid valve SLP increases, the spool valve element 150a of the primary pressure control valve 150 moves upward in FIG. 4. Thus, the primary pressure Pin to the primary-side hydraulic cylinder 42c increases. On the other hand, in a state where the predetermined hydraulic pressure is supplied to the primary-side hydraulic cylinder 42c, when the control hydraulic pressure $P_{SLP}$ that is output from the linear solenoid valve SLP decreases, the spool valve element 150a of the primary pressure control valve 150 moves downward in FIG. 4. Thus, the primary pressure Pin to the primary-side hydraulic cylinder 42c decreases.

An orifice 156 is provided in a fluid passage 154 between the primary-side hydraulic cylinder 42c and the primary pressure control valve 150 for the purpose of fail-safe, or the like. Because of provision of the orifice 156, for example, even when the linear solenoid valve SLP fails, the internal pressure in the primary-side hydraulic cylinder 42c does not rapidly reduce. Thus, for example, rapid deceleration of the vehicle due to a failure of the linear solenoid valve SLP is suppressed.

The secondary pressure control valve 152 includes a spool valve element 152a. The spool valve element 152a is provided so as to be movable in the axial direction, and allows the line pressure PL to be supplied from the input port 152i to the secondary pulley 46 via the output port 152t as the secondary pressure Pd by opening the input port 152i. The secondary pressure control valve 152 includes a spring

152*b*. The spring 152*b* serves as urging means for urging the spool valve element 152*a* in the valve opening direction. The secondary pressure control valve 152 includes a fluid chamber 152*c*. The fluid chamber 152*c* accommodates the spring 152*b*, and receives a control hydraulic pressure $P_{SLS}$ for applying thrust in the valve opening direction to the spool valve element 152*a*. The secondary pressure control valve 152 includes a feedback fluid chamber 152*d*. The feedback fluid chamber 152*d* receives the secondary pressure Pd output from the output port 152*t* in order to apply thrust in the valve closing direction to the spool valve element 152*a*. The secondary pressure control valve 152 includes a fluid chamber 152*e*. The fluid chamber 152*e* receives the modulator pressure Pm in order to apply thrust in the valve closing direction to the spool valve element 152*a*.

The thus configured secondary pressure control valve 152, for example, regulates and controls the line pressure PL by using the control hydraulic pressure $P_{SLS}$ as a pilot pressure, and supplies the regulated pressure to the secondary-side hydraulic cylinder 46*c* of the secondary pulley 46. Thus, the secondary pressure Pd that is supplied to the secondary-side hydraulic cylinder 46*c* is controlled. For example, in a state where a predetermined hydraulic pressure is supplied to the secondary-side hydraulic cylinder 46*c*, when the control hydraulic pressure $P_{SLS}$ that is output from the linear solenoid valve SLS increases, the spool valve element 152*a* of the secondary pressure control valve 152 moves upward in FIG. 4. Thus, the secondary pressure Pd to the secondary-side hydraulic cylinder 46*c* increases. On the other hand, in a state where the predetermined hydraulic pressure is supplied to the secondary-side hydraulic cylinder 46*c*, when the control hydraulic pressure $P_{SLS}$ that is output from the linear solenoid valve SLS decreases, the spool valve element 152*a* of the secondary pressure control valve 152 moves downward in FIG. 4. Thus, the secondary pressure Pd to the secondary-side hydraulic cylinder 46*c* decreases.

An orifice 160 is provided in a fluid passage 158 between the secondary-side hydraulic cylinder 46*c* and the secondary pressure control valve 152 for the purpose of fail-safe, or the like. Because of provision of the orifice 160, for example, even when the linear solenoid valve SLS fails, the internal pressure in the secondary-side hydraulic cylinder 46*c* does not rapidly reduce. Thus, for example, a belt slip due to a failure of the linear solenoid valve SLS is prevented.

In the thus configured hydraulic control circuit 70, for example, the primary pressure Pin that is regulated by the linear solenoid valve SLP and the secondary pressure Pd that is regulated by the linear solenoid valve SLS are controlled such that a belt slip does not occur and a belt clamping pressure that does not unnecessarily increase is generated by the drive-side pulley 42 and the driven-side pulley 46.

In the thus configured vehicle driving device 10, so-called flexible lockup start control (hereinafter, flexible start control) is executed for smoothing an increase in the rotation speed of the engine 12 and improving fuel economy by slip-engaging the lockup clutch 26 at the time when the vehicle starts from a state where the vehicle is stopped. Here, when working fluid is in a high fluid temperature state or a specific working fluid having a low-viscosity characteristic is used, the amount of leakage from the hydraulic control circuit 70 also increases. Thus, an actual pressure decreases with respect to an instructed pressure that is output from the electronic control unit.

Figure 5:
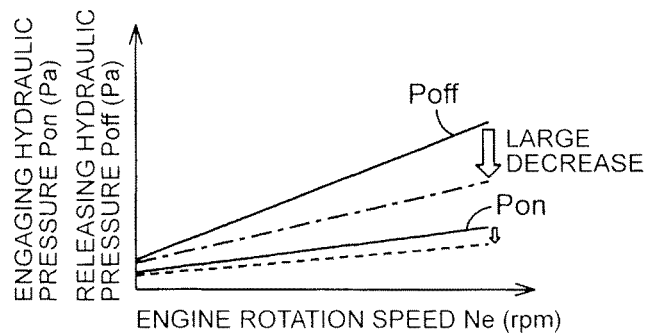
FIG. 5 shows the characteristics of an engaging hydraulic pressure in an engaging-side hydraulic chamber and a releasing hydraulic pressure in a releasing-side hydraulic chamber, of the lockup clutch of the hydraulic control circuit shown in FIG. 2 and FIG. 3.

FIG. 5 shows the characteristics of the hydraulic pressure Pon (engaging hydraulic pressure Pon) in the engaging-side hydraulic chamber 98 of the lockup clutch 26 and the hydraulic pressure Poff (releasing hydraulic pressure Poff) in the releasing-side hydraulic chamber 102, of the hydraulic control circuit 70 according to the present embodiment, in which the abscissa axis represents engine rotation speed Ne at the time of executing flexible start control. In FIG. 5, the continuous lines indicate the engaging hydraulic pressure Pon and the releasing hydraulic pressure Poff when an ordinary working fluid is used. In FIG. 5, the dashed line indicates the engaging hydraulic pressure Pon when a working fluid in a high fluid temperature state or having a low-viscosity characteristic is used. In FIG. 5, the alternate long and short dashed line indicates the releasing hydraulic pressure Poff when a working fluid in a high fluid temperature state or having a low-viscosity characteristic is used. As shown in FIG. 5, when flexible start control is initiated, the engine rotation speed Ne gradually increases, and the amount of working fluid that is discharged from the oil pump increases accordingly. Thus, the line pressure PL increases, and the engaging hydraulic pressure Pon and the releasing hydraulic pressure Poff also increase accordingly. For the hydraulic control circuit 70, when a working fluid in a high fluid temperature state or having a low-viscosity characteristic is used, it is found that a decrease in the releasing hydraulic pressure Poff is larger than a decrease in the engaging hydraulic pressure Pon. Thus, when the flexible start control is initiated, the lockup clutch 26 is engaged in a state where the releasing hydraulic pressure Poff is decreased, so the lockup clutch 26 is easily rapidly engaged, and, because of that, there is a possibility that a shock occurs.

Therefore, an electronic control unit 200 (see FIG. 6) according to the present embodiment initiates flexible start control on the condition that a predetermined condition is satisfied when a condition for initiating flexible start control over the lockup clutch 26 is satisfied. Thus, rapid engagement of the lockup clutch is prevented by ensuring the engaging hydraulic pressure Pon and the releasing hydraulic pressure Poff at the timing of the initiation of flexible lockup control. Hereinafter, specific control operations of the electronic control unit 200 in flexible start control will be described.

Figure 6:
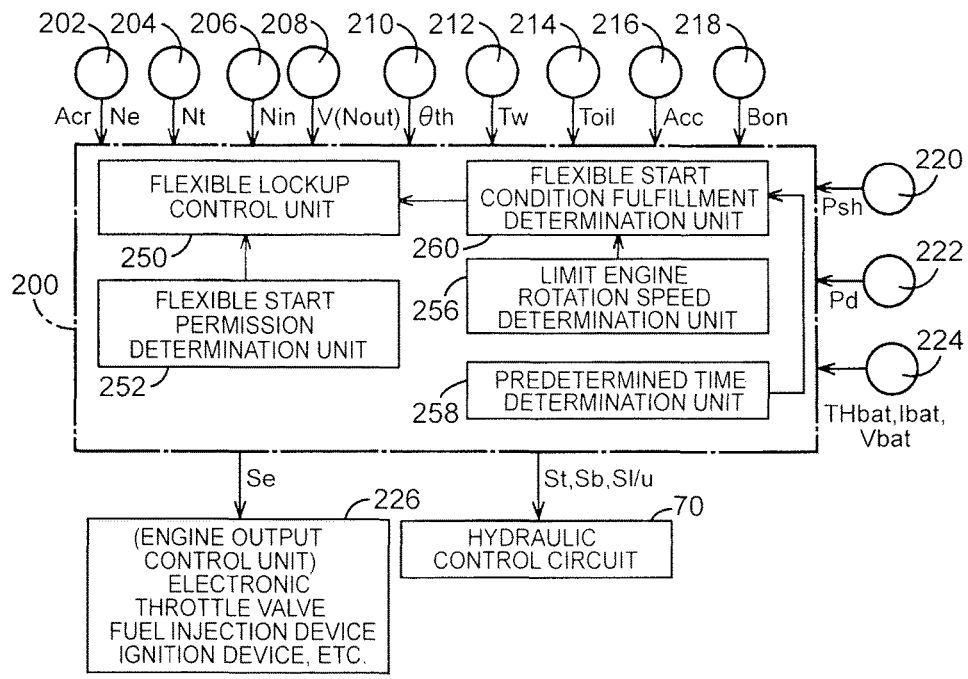

FIG. 6 is a functional block diagram that illustrates a relevant portion of control functions mainly associated with flexible start control in the electronic control unit 200 that controls the hydraulic control circuit 70, the engine 12, and the like. The vehicle driving device 10, for example, includes the electronic control unit 200 that includes a control device for a vehicle continuously variable transmission, associated with shift control over the continuously variable transmission 18, and the like. The electronic control unit 200 is, for example, configured to include a so-called microcomputer including a CPU, a RAM, a ROM, an input/output interface, and the like. The CPU executes various controls over the vehicle driving device 10 by executing signal processing in accordance with programs prestored in the ROM while utilizing the temporary storage function of the RAM. For example, the electronic control unit 200 executes output control over the engine 12, shift control over the continuously variable transmission 18, belt clamping pressure control, torque capacity control over the lockup clutch 26, and the like. The electronic control unit 200 is, where necessary, separately formed into engine control use, hydraulic control use for the continuously variable transmission 18 and the lockup clutch 26, and the like.

A signal indicating a rotation angle (position) Acr of the crankshaft and the rotation speed (engine rotation speed) Ne of the engine 12, detected by an engine rotation speed sensor 202, and a signal indicating the rotation speed (turbine rotation speed) Nt of the turbine shaft 34, detected by a turbine rotation speed sensor 204, are supplied to the electronic control unit 200. A signal indicating an input shaft rotation speed Nin (primary rotation speed Nin), detected by an input shaft rotation speed sensor 206, a signal indicating an output shaft rotation speed Nout (secondary rotation speed Nout), detected by an output shaft rotation speed sensor 208, and a signal indicating a throttle valve opening degree θth of an electronic throttle valve, detected by a throttle sensor 210, are supplied to the electronic control unit 200. The input shaft rotation speed Nin is the rotation speed of the input shaft 36 (primary pulley 42) of the continuously variable transmission 18. The output shaft rotation speed Nout is the rotation speed of the output shaft 44 (secondary pulley 46) of the continuously variable transmission 18, and corresponds to the vehicle speed V. A signal indicating a coolant temperature Tw of the engine 12, detected by a coolant temperature sensor 212, a signal indicating a working fluid temperature Toil of working fluid of the continuously variable transmission 18, and the like, detected by a CVT fluid temperature sensor 214, and a signal indicating an accelerator operation amount Acc, detected by an accelerator operation amount sensor 216, are supplied to the electronic control unit 200. The accelerator operation amount Acc is the operation amount of an accelerator pedal, which is a driver's acceleration request amount. A signal indicating a brake on Bon, detected by a foot brake switch 218, a signal indicating a lever position (operating position) Psh of a shift lever, detected by a lever position sensor 220, and a signal indicating the secondary pressure Pd, detected by a secondary pressure sensor 222, are supplied to the electronic control unit 200. The brake on Bon indicates a state where a foot brake that is a service brake is operated. The secondary pressure Pd is a hydraulic pressure supplied to the secondary pulley 46. Signals indicating a battery temperature THbat, a battery input/output current (battery charge/discharge current) Ibat and a battery voltage Vbat, detected by a battery sensor 224, and the like, are supplied to the electronic control unit 200. The electronic control unit 200, for example, calculates one by one the state of charge (level of charge) SOC of a battery (electrical storage device) on the basis of the above battery temperature THbat, battery charge/discharge current Ibat, battery voltage Vbat, and the like.

An engine output control command signal Se for output control over the engine 12 is supplied from the electronic control unit 200 to an engine output control unit 226. Specifically, a throttle valve opening degree signal for driving a throttle actuator that controls the throttle valve opening degree θth of the electronic throttle valve, an injection signal for controlling the amount of fuel that is injected from a fuel injection device, an ignition timing signal for controlling the ignition timing of the engine 12 by an ignition device, and the like, are output from the electronic control unit 200 to the engine output control unit 226. A shift control command signal St for varying the speed ratio γ of the continuously variable transmission 18, a clamping pressure control command signal Sb for adjusting the clamping pressure of the transmission belt 48, a lockup control command signal Sl/u for controlling engagement, release and slip amount of the lockup clutch 26, a command signal for driving a solenoid valve (described later), a command signal for driving the linear solenoid valve that adjusts engaging force of the lockup clutch 26, a signal for releasing or semi-engaging the forward clutch C1 or the reverse brake B1 during neutral control; a signal for adjusting the engaging pressure of the forward clutch C1 or reverse brake B1 during garage shift, and the like, are output from the electronic control unit 200 to the hydraulic control circuit 70. The solenoid valve switches a valve position of the lockup relay valve in the hydraulic control circuit 70.

The electronic control unit 200 is configured to include a flexible lockup control unit 250 (flexible lockup control means), a flexible start permission determination unit 252 (flexible start initiation determination means), a limit engine rotation speed determination unit 256 (limit engine rotation speed determination means), a predetermined time determination unit 258 (predetermined time determination means) and a flexible start condition fulfillment determination unit 260 (flexible start condition fulfillment determination means).

The flexible lockup control unit 250 executes flexible start control for slip-engaging the lockup clutch 26 at the time when the vehicle starts from a state where the vehicle is stopped. That is, when a preset predetermined flexible start control initiation condition is satisfied, part of an engine torque Te (output torque) of the engine 12 is input to the forward-reverse switching device 16 side via the lockup clutch 26 by setting the lockup clutch 26 in a slip-engaged state. Thus, vehicle start control is executed for transmitting power via fluid and the lockup clutch 26 in the torque converter 14 at the time when the vehicle starts. By executing the flexible start control, unnecessary racing of the engine rotation speed Ne is suppressed, and fuel economy improves.

Whether to run the flexible lockup control unit 250 is determined by the flexible start permission determination unit 252. For example, when the flexible start permission determination unit 252 detects that depression of the foot brake is released in a state where the vehicle is stopped and the accelerator operation amount Acc exceeds 20%, the flexible start permission determination unit 252 determines that flexible start control is permitted to be executed.

Here, in the hydraulic control circuit 70 according to the present embodiment, the input port 152*i* and the output port 152*t* are communicated with each other in advance in the secondary pressure control valve 152 at the time of flexible start control. Thus, the line pressure PL is supplied to the driven-side hydraulic actuator 46*c* via the secondary pressure control valve 152. Thus, at the time of flexible start control, as the fluid passage 158, which connects the secondary pressure control valve 152 and the driven-side hydraulic actuator 46*c* with each other, communicates with the oil pump 28, the line pressure PL is output to the fluid passage 158. Thus, at the time of flexible start control, the line pressure PL is detected by the secondary pressure sensor 222 provided in the fluid passage 158. The fluid passage 158 is an example of a fluid passage that communicates with an oil pump according to the invention.

The limit engine rotation speed determination unit 256 determines a cracking limit engine rotation speed Necra on the basis of the line pressure PL and the working fluid temperature Toil. The limit engine rotation speed determination unit 256, for example, determines the cracking limit engine rotation speed Necra (hereinafter, limit engine rotation speed Necra) on the basis of the line pressure PL and the working fluid temperature Toil by consulting a two-dimensional map, which is formed of the line pressure PL and the fluid temperature Toil of working fluid (working fluid temperature Toil) and obtained and stored in advance. The limit engine rotation speed Necra is set to a threshold (cracking point) of the engine rotation speed Ne at which a shock that occurs at the time of engaging the lockup clutch 26 in flexible start control reduces to such a degree that the driver does not experience the shock, and is obtained through an experiment or analysis in advance. For example, by changing the condition of the line pressure PL and the working fluid temperature Toil, the engine rotation speed Ne, at which a shock resulting from flexible start control under that condition becomes smaller than or equal to a predetermined value, is obtained. Specifically, when a working fluid in a high fluid temperature state or having a low-viscosity characteristic is used as shown in FIG. 5, the releasing hydraulic pressure Poff that increases with the engine rotation speed Ne is in a decreased state. Thus, in order to ensure the releasing hydraulic pressure Poff to such a degree that no shock occurs, it is required to engage the lockup clutch at a higher engine rotation speed Ne than that when the working fluid temperature Toil is low. Similarly, because the amount of leakage increases as the line pressure PL increases, it is required to engage the lockup clutch when the engine rotation speed Ne is higher in order to suppress a shock. The shock is, for example, determined from a rotation speed variation amount of a predetermined rotating element.

Figure 7:
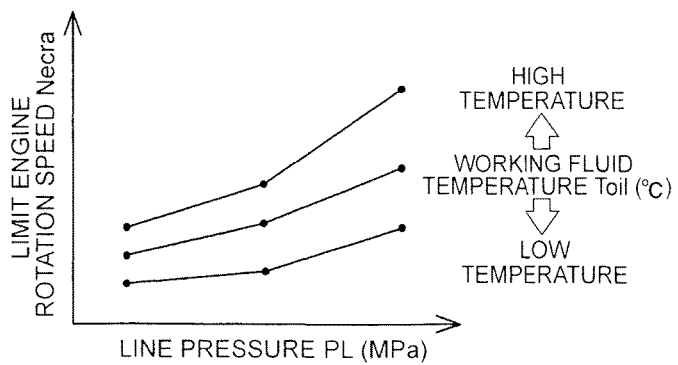
FIG. 7 is a graph that shows the correlation between both a line pressure and a working fluid temperature of working fluid and a limit engine rotation speed.

FIG. 7 shows the correlation among the line pressure PL, the working fluid temperature Toil of working fluid and the limit engine rotation speed Necra. In FIG. 7, the abscissa axis represents the line pressure PL, and the ordinate axis represents the limit engine rotation speed Necra. Three continuous lines in FIG. 7 correspond to changes in the working fluid temperature Toil, and the working fluid temperature Toil increases at the upper-side continuous line. As shown in FIG. 7, the limit engine rotation speed Necra increases as the working fluid temperature Toil increases. The limit engine rotation speed Necra increases as the line pressure PL increases. This is because the viscosity of working fluid decreases and the amount of leakage from the hydraulic control circuit 70 increases as the working fluid temperature Toil increases, and the amount of leakage of working fluid from the hydraulic control circuit 70 increases as the line pressure PL increases. That is, in the hydraulic control circuit 70, as the amount of leakage of working fluid from the hydraulic control circuit 70 increases, a working fluid amount Q becomes short, and the releasing hydraulic pressure Poff of the releasing-side hydraulic chamber 102 tends to decrease. The limit engine rotation speed Necra that proportionally correlates with the displacement of the oil pump 28 for compensating for the amount of leakage increases.

Figure 8:
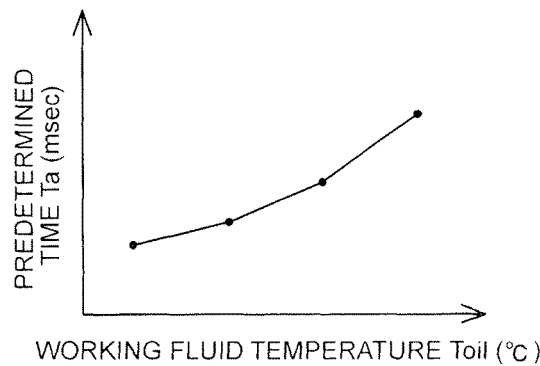
FIG. 8 is a view that shows the correlation between a working fluid temperature and a predetermined time.

The predetermined time determination unit 258 determines a predetermined time Ta on the basis of the working fluid temperature Toil of working fluid. The predetermined time determination unit 258, for example, determines the predetermined time Ta on the basis of a map formed of the working fluid temperature Toil of working fluid and the predetermined time Ta, obtained and stored in advance. The predetermined time Ta is a prescribed value of standby time of which a base point is set to timing at which the engine rotation speed Ne becomes higher than or equal to the limit engine rotation speed Necra, and is provided in order to reliably ensure the working fluid amount Q. FIG. 8 shows the correlation between the working fluid temperature Toil and the predetermined time Ta. As shown in FIG. 8, the predetermined time Ta extends as the working fluid temperature Toil increases. This is because the viscosity of working fluid decreases and the amount of leakage of working fluid from the hydraulic control circuit 70 increases as the working fluid temperature Toil increases. The predetermined time determination unit 258 determines the predetermined time Ta on the basis of an actual working fluid temperature Toil from the correlation shown in FIG. 8, a map obtained in advance, or the like.

The flexible start condition fulfillment determination unit 260 determines whether a flexible start control initiation condition is satisfied on the basis of the limit engine rotation speed Necra determined by the limit engine rotation speed determination unit 256, the predetermined time Ta determined by the predetermined time determination unit 258, an actual engine rotation speed Ne and an elapsed time T. Specifically, it is determined whether the actual engine rotation speed Ne becomes higher than or equal to the limit engine rotation speed Necra and the engine rotation speed Ne higher than or equal to the limit engine rotation speed Necra is kept (continued) for the predetermined time Ta or longer. The elapsed time T is counted with reference to timing at which the engine rotation speed Ne becomes higher than or equal to the limit engine rotation speed Necra. When the flexible start condition fulfillment determination unit 260 determines that the engine rotation speed Ne higher than or equal to the limit engine rotation speed Necra is kept for the predetermined time Ta or longer, the flexible start condition fulfillment determination unit 260 outputs a command to the flexible lockup control unit 250 such that coupling of the lockup clutch 26 through flexible start control is initiated. In other words, the flexible start condition fulfillment determination unit 260 prohibits execution of flexible start control unless the initiation condition is satisfied.

Here, the working fluid amount Q discharged from the oil pump 28 is calculated by the product of the engine rotation speed Ne and a set rated capacity of the oil pump 28. That is, the working fluid amount Q is allowed to be calculated on the basis of the engine rotation speed Ne. Thus, it is possible to determine the timing of flexible start control on the basis of the working fluid amount Q instead of the engine rotation speed Ne. For example, a map that sets the limit working fluid amount Qcra and that is formed of the line pressure PL and the working fluid temperature Toil may be obtained in advance, the limit working fluid amount Qcra may be obtained on the basis of the map, and flexible start control may be executed on the condition that the actual working fluid amount Q larger than or equal to the limit working fluid amount Qcra is kept for the predetermined time Ta or longer. In other words, the condition that the engine rotation speed higher than or equal to the limit engine rotation speed Necra is kept for the predetermined time or longer is an example of determination as to the fact that the working fluid amount Q that is supplied to the releasing-side hydraulic chamber 102 becomes larger than or equal to a predetermined value. As described above, because the engine rotation speed Ne and the working fluid amount Q are in a one-to-one correspondence with each other, the engine rotation speed Ne substantially is an example of a working fluid amount of the oil pump according to the invention, and the limit engine rotation speed Necra substantially is an example of a predetermined value of the working fluid amount according to the invention.

Figure 9:
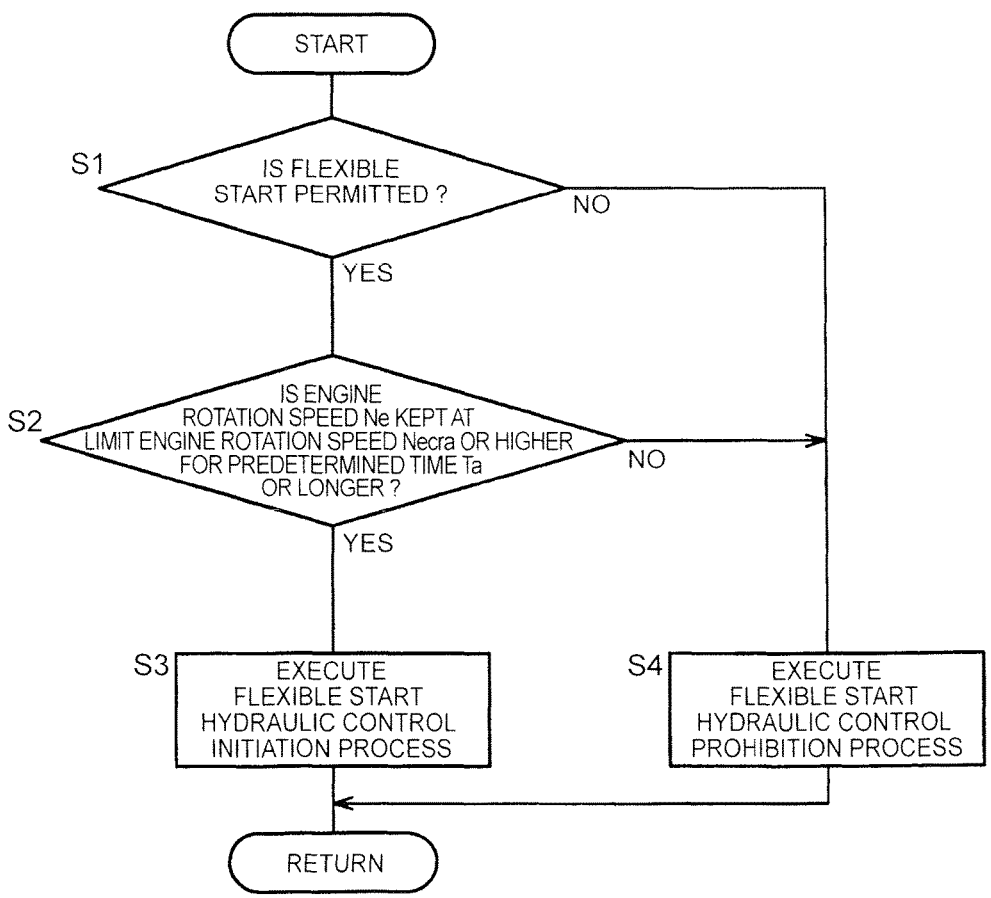
FIG. 9 is a flowchart that illustrates a relevant portion of control operations of the electronic control unit shown in FIG. 6, that is, control operations for reducing a delay of coupling of the lockup clutch while preventing rapid engagement of the lockup clutch at the time of executing flexible start control.

FIG. 9 is a flowchart that illustrates a relevant portion of control operations of the electronic control unit 200, that is, control operations for reducing a delay of coupling of the lockup clutch 26 while preventing rapid engagement of the lockup clutch 26 at the time of executing flexible start control. The flowchart is, for example, repeatedly executed at an extremely short cycle time of about several milliseconds to several tens of milliseconds.

First, in S1 corresponding to the flexible start permission determination unit 252, it is determined whether execution of flexible start control is permitted. When negative determination is made in S1, initiation of coupling of the lockup clutch 26 through flexible start control is prohibited in S4. When affirmative determination is made in S1, the process proceeds to S2 corresponding to the limit engine rotation speed determination unit 256, the predetermined time determination unit 258 and the flexible start condition fulfillment determination unit 260.

In S2, the limit engine rotation speed Necra is determined on the basis of the line pressure PL and the working fluid temperature Toil by consulting the map for the limit engine rotation speed Necra, and the predetermined time Ta is further determined on the basis of the working fluid temperature Toil. After that, it is determined whether the actual engine rotation speed Ne higher than or equal to the determined limit engine rotation speed Necra is kept for the predetermined time Ta or longer. When negative determination is made in S2, the process proceeds to S4, and coupling of the lockup clutch 26 through flexible start control is prohibited. When affirmative determination is made in S2, coupling of the lockup clutch 26 through flexible start control is initiated in S3 corresponding to, the flexible lockup control unit 250.

Figure 10A:
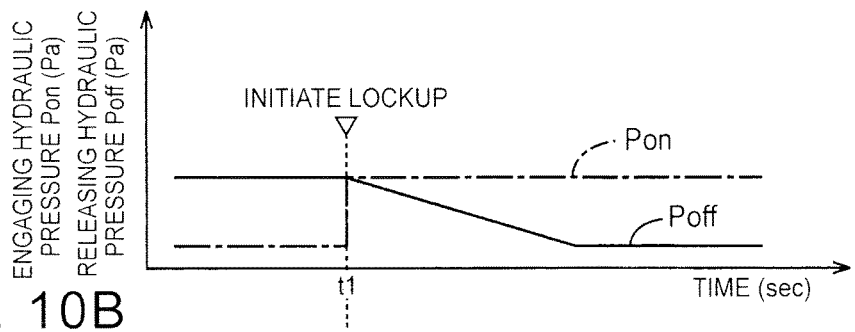
FIG. 10A to FIG. 10E are time charts that illustrate operation results through operation control of the electronic control unit shown in FIG. 6.
Figure 10B:
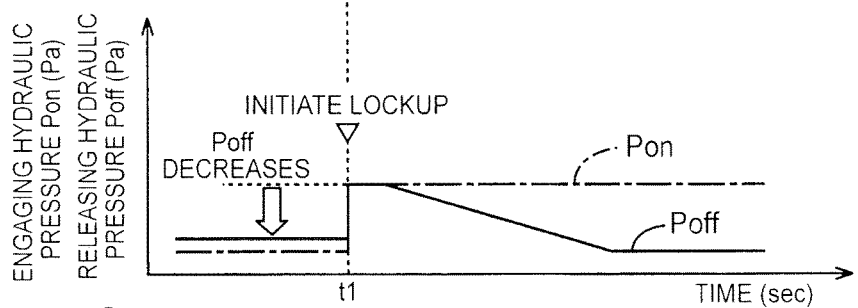
Figure 10C:
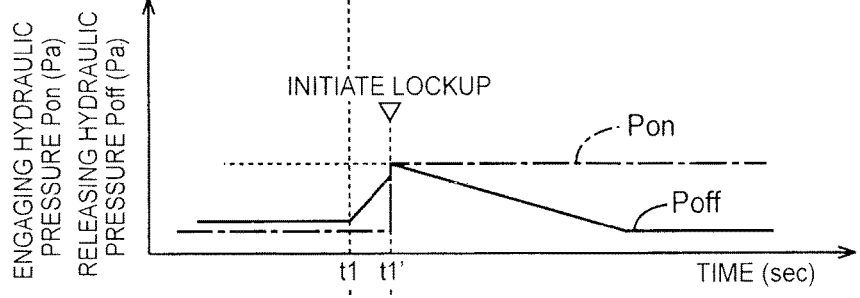

FIG. 10A to FIG. 10E are time charts that illustrate operation results through operation control of the electronic control unit 200. In FIG. 10A to FIG. 10E, the abscissa axis represents time (sec), and the ordinate axis, represents the engaging hydraulic pressure Pon (alternate long and short dashed line) and releasing hydraulic pressure Poff (continuous line) of the lockup clutch 26. FIG. 10A shows the case where the releasing hydraulic pressure Poff of the releasing-side hydraulic chamber 102 is high from the timing of the initiation of flexible start control. FIG. 10B shows the case where the releasing hydraulic pressure Poff of the releasing-side hydraulic chamber 102 is lower than the releasing hydraulic pressure Poff of FIG. 10A at the timing of the initiation of flexible start control. FIG. 10C shows the case where control according to the present embodiment is executed on FIG. 10B. In FIG. 10A to FIG. 10E, description will be made on the assumption that an instructed pressure and an actual pressure of the line pressure PL coincide with each other.

As shown in FIG. 10A, when the releasing hydraulic pressure Poff is relatively high from the timing at which execution of flexible start control is determined, rapid engagement of the lockup clutch 26 does not occur because the releasing hydraulic pressure Poff is high even when flexible start control is initiated immediately after the determination.

FIG. 10B shows the case where coupling of the lockup clutch 26 through flexible start control is initiated in a state where the releasing hydraulic pressure Poff of the releasing-side hydraulic chamber 102 is low. When execution of flexible start control is determined at t1 timing and coupling of the lockup clutch 26 is initiated immediately after the determination, the lockup clutch 26 is rapidly engaged because the releasing hydraulic pressure Poff is low.

Figure 10D:
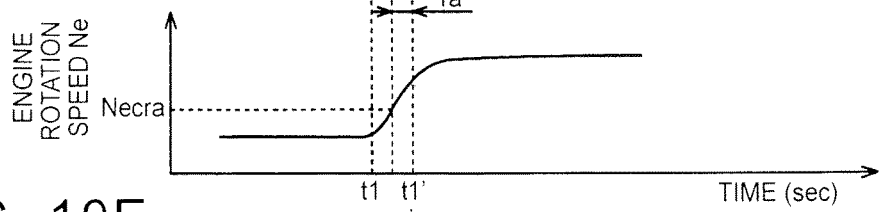
Figure 10E:
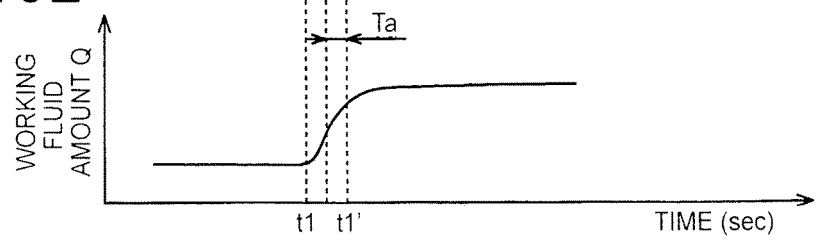

FIG. 10C corresponds to the case where control according to the present embodiment is executed. When execution of flexible start control is determined at t1 timing, the limit engine rotation speed Necra and the predetermined time Ta are set, and the process waits until the actual engine rotation speed Ne higher than or equal to the limit engine rotation speed Necra is kept for the predetermined time Ta or longer. As shown in FIG. 10D, at timing t1' at which the predetermined time Ta elapses in the state where the engine rotation speed Ne is higher than or equal to the limit engine rotation speed Necra, it is determined that the condition of the initiation of coupling of the lockup clutch 26 is satisfied, and coupling of the lockup clutch 26 is started.

As described above, according to the present embodiment, the fact that the engine rotation speed Ne is higher than or equal to the limit engine rotation speed Necra is set as a condition for initiating coupling of the lockup clutch 26. Thus, coupling of the lockup clutch 26 is initiated in a state where the working fluid amount Q is sufficiently ensured. Thus, for example, it is possible to reduce rapid engagement of the lockup clutch 26, which occurs through coupling of the lockup clutch 26 in a state where the releasing hydraulic pressure Poff of the releasing-side hydraulic chamber 102 of the lockup clutch 26 is decreased. Here, the limit engine rotation speed Necra is appropriately determined on the basis of the line pressure PL and the working fluid temperature Toil of working fluid. Thus, it is possible to reduce a delay of coupling of the lockup clutch 26 by ensuring the working fluid amount Q while preventing rapid engagement of the lockup clutch 26.

According to the present embodiment, when the engine rotation speed Ne higher than or equal to the limit engine rotation speed Necra, determined on the basis of the line pressure PL and the working fluid temperature Toil, is kept, it may be determined that the working fluid amount Q has reached the limit working fluid amount Qcra or larger. In this way, the working fluid amount Q is allowed to be calculated from the engine rotation speed Ne, so it is possible to easily determine that the working fluid amount Q becomes larger than or equal to the limit working fluid amount Qcra on the basis of the engine rotation speed Ne. For example, for a hydraulic circuit, or the like, with no sensor for detecting the line pressure PL, the limit engine rotation speed Necra is determined on the basis of an instructed pressure.

According to the present embodiment, when the engine rotation speed Ne higher than or equal to the limit engine rotation speed Necra is kept for the predetermined time Ta or longer, it may be determined that the working fluid amount Q becomes larger than or equal to the limit working fluid amount Qcra. In this way, it is possible to easily determine the fact that the working fluid amount Q becomes larger than or equal to the limit working fluid amount Qcra on the basis of the engine rotation speed Ne and the predetermined time Ta.

According to the present embodiment, the predetermined time Ta may be determined on the basis of the working fluid temperature Toil. In this way, it is possible to set the appropriate predetermined time Ta that compensates for the amount of leakage of the working fluid, which increases in proportion to the working fluid temperature Toil.

According to the present embodiment, the fact that the engine rotation speed Ne higher than or equal to the limit engine rotation speed Necra is kept for the predetermined time Ta or longer may be set as a condition. Thus, it is possible to reliably ensure the working fluid amount Q. The predetermined time Ta is appropriately set on the basis of the working fluid temperature Toil. Thus, it is possible to reduce a delay of coupling of the lockup clutch 26 by ensuring the working fluid amount Q while preventing rapid engagement of the lockup clutch 26.

According to the present embodiment, the limit engine rotation speed Necra may be determined on the basis of the line pressure PL and the working fluid temperature Toil. Thus, it is possible to easily determine the limit engine rotation speed Necra.

According to the present embodiment, the limit engine rotation speed Necra may be increased as the line pressure PL increases. Thus, it is possible to prevent shortage of the working fluid amount by compensating for the amount of leakage of working fluid, which increases as the line pressure PL increases.

According to the present embodiment, the limit engine rotation speed Necra may be increased as the working fluid temperature Toil of working fluid increases. Thus, it is possible to prevent shortage of the working fluid amount by compensating for the amount of leakage of working fluid, which increases as the working fluid temperature Toil increases.

The embodiment of the invention is described in detail with reference to the accompanying drawings. The invention is applicable in other embodiments.

For example, in the above-described embodiment, for example, the limit engine rotation speed Necra is determined on the basis of the line pressure PL (actual pressure) detected by the secondary pressure sensor 222. The limit engine rotation speed Necra may be determined on the basis of the line pressure PL that is an instructed pressure that is output from the electronic control unit 200.

In the above-described embodiment, flexible start control is started on the condition that the engine rotation speed Ne higher than or equal to the limit engine rotation speed Necra is kept for the predetermined time Ta or longer. The condition associated with the predetermined time Ta is not necessarily required, and flexible start control may be initiated on the condition that the engine rotation speed Ne becomes higher than or equal to the limit engine rotation speed Necra.

In the above-described embodiment, description is made on the assumption that flexible start control is executed from the state where the vehicle is stopped. The invention is not limited to flexible start control from the vehicle stopped state. The invention is applicable as needed when the lockup clutch 26 is coupled, for example, when the lockup clutch 26 is coupled while traveling in a state where the lockup clutch 26 is released, or the like.

In the above-described embodiment, the secondary pressure sensor 222 is provided in the fluid passage between the secondary pressure control valve 152 and the driven-side hydraulic actuator 46c. The limit engine rotation speed Necra is determined on the basis of the line pressure PL that is detected by the sensor 222. A hydraulic pressure sensor may be provided in a discharge fluid passage of the oil pump 28, and the limit engine rotation speed Necra may be determined on the basis of the line pressure PL that is detected by the hydraulic pressure sensor.

In the above-described embodiment, the belt-type continuously variable transmission 18 is provided between the engine 12 and the drive wheels 24. The transmission according to the invention is not necessarily limited to the continuously variable transmission. For example, the transmission may be a transmission of another type, such as a step-shift automatic transmission. The invention is not limited to the configuration including a transmission.

In the above-described embodiment, the torque converter 14 is used as a fluid transmission device. The fluid transmission device may be configured to be provided with fluid coupling.

In the above-described embodiment, the timing of the initiation of flexible start control is determined on the basis of the engine rotation speed Ne. Because the engine rotation speed Ne is in a one-to-one correspondence with the working fluid amount Q, the timing of the initiation of flexible start control may be determined from the working fluid amount Q. That is, determination based on the engine rotation speed Ne and determination based on the working fluid amount Q are substantially not different from each other.

In the above-described embodiment, the limit engine rotation speed Necra and the predetermined time Ta are determined on the basis of the working fluid temperature Toil. Because the working fluid temperature Toil and the viscosity of working fluid are in a one-to-one correspondence with each other, the viscosity of working fluid may be used instead of the working fluid temperature Toil.

In the above-described embodiment, the map for obtaining the limit engine rotation speed Necra and the predetermined time Ta is obtained and stored in advance. The configuration is not limited to the map. For example, a relational expression that uses the line pressure and the working fluid temperature Toil as variables is used to calculate the limit engine rotation speed Necra and the predetermined time Ta. Another method may be used to obtain the limit engine rotation speed Necra and the predetermined time Ta.

In the above-described embodiment, the secondary pressure control valve 152 is provided between the fluid passage to which the line pressure PL is supplied and the fluid passage 158 in which the secondary pressure sensor 222 is provided. A configuration may be such that the secondary pressure control valve 152 is not provided and the line pressure PL is directly supplied to the driven-side hydraulic actuator 46c.

The above-described embodiments are only illustrative, and the invention may be implemented in modes including various modifications and improvements on the basis of the knowledge of persons skilled in the art.

What is claimed is:
1. A vehicle comprising:
a driving source;
a drive wheel;
a fluid transmission device provided in a power transmission path between the driving source and the drive wheel;
an oil pump configured to operate with rotation of the driving source;
a lockup clutch configured to selectively directly couple input and output sides of the fluid transmission device;
the lockup clutch configured such that:
   i) working fluid is supplied to an engaging-side hydraulic chamber and a releasing-side hydraulic chamber of the lockup clutch by using a hydraulic pressure of the working fluid that is discharged from the oil pump as a source pressure,
   ii) the working fluid is supplied to the releasing-side hydraulic chamber when the lockup clutch is released, and
   iii) the working fluid is supplied to the engaging-side hydraulic chamber when engagement of the lockup clutch is initiated; and
an electronic control unit configured to:
   (a) initiate engagement of the lockup clutch after ensuring that a working fluid amount that is supplied to the releasing-side hydraulic chamber has reached a predetermined value or larger, and

(b) determine the predetermined value on the basis of a hydraulic pressure of the working fluid flowing through a fluid passage that communicates with the oil pump.

2. The vehicle according to claim 1, wherein the electronic control unit is configured to determine that the working fluid amount has reached the predetermined value or larger when a rotation speed of the driving source is kept at a predetermined rotation speed or higher, the predetermined rotation speed being determined on the basis of the hydraulic pressure of the working fluid and a fluid temperature of the working fluid.

3. The vehicle according to claim 1, wherein the electronic control unit is configured to determine that the working fluid amount has reached the predetermined value or larger when the rotation speed of the driving source is kept at the predetermined rotation speed or higher for a predetermined time or longer.

4. The vehicle according to claim 3, wherein the electronic control unit is configured to determine the predetermined time on the basis of a fluid temperature of the working fluid.

5. The vehicle according to claim 1, wherein the electronic control unit is configured to set the predetermined value such that the predetermined value increases as the hydraulic pressure of the working fluid flowing through the fluid passage that communicates with the oil pump increases.

6. The vehicle according to claim 1, wherein the electronic control unit is configured to set the predetermined value such that the predetermined value increases as a fluid temperature of the working fluid increases.

7. A control method for a vehicle including:
a driving source;
a drive wheel;
a fluid transmission device provided in a power transmission path between the driving source and the drive wheel;
an oil pump configured to operate with rotation of the driving source;
a lockup clutch configured to selectively directly couple input and output sides of the fluid transmission device, the lockup clutch configured such that
  i) working fluid is supplied to an engaging-side hydraulic chamber and a releasing-side hydraulic chamber of the lockup clutch by using a hydraulic pressure of the working fluid that is discharged from the oil pump as a source pressure,
  ii) the working fluid is supplied to the releasing-side hydraulic chamber when the lockup clutch is released, and
  iii) the working fluid is supplied to the engaging-side hydraulic chamber when engagement of the lockup clutch is initiated; and
an electronic control unit,
the control method comprising:
  (a) initiating engagement of the lockup clutch by the electronic control unit after ensuring that a working fluid amount that is supplied to the releasing-side hydraulic chamber has reached a predetermined value or larger, and
  (b) determining the predetermined value by the electronic control unit on the basis of a hydraulic pressure of the working fluid flowing through a fluid passage that communicates with the oil pump.

* * * * *